UNITED STATES PATENT OFFICE.

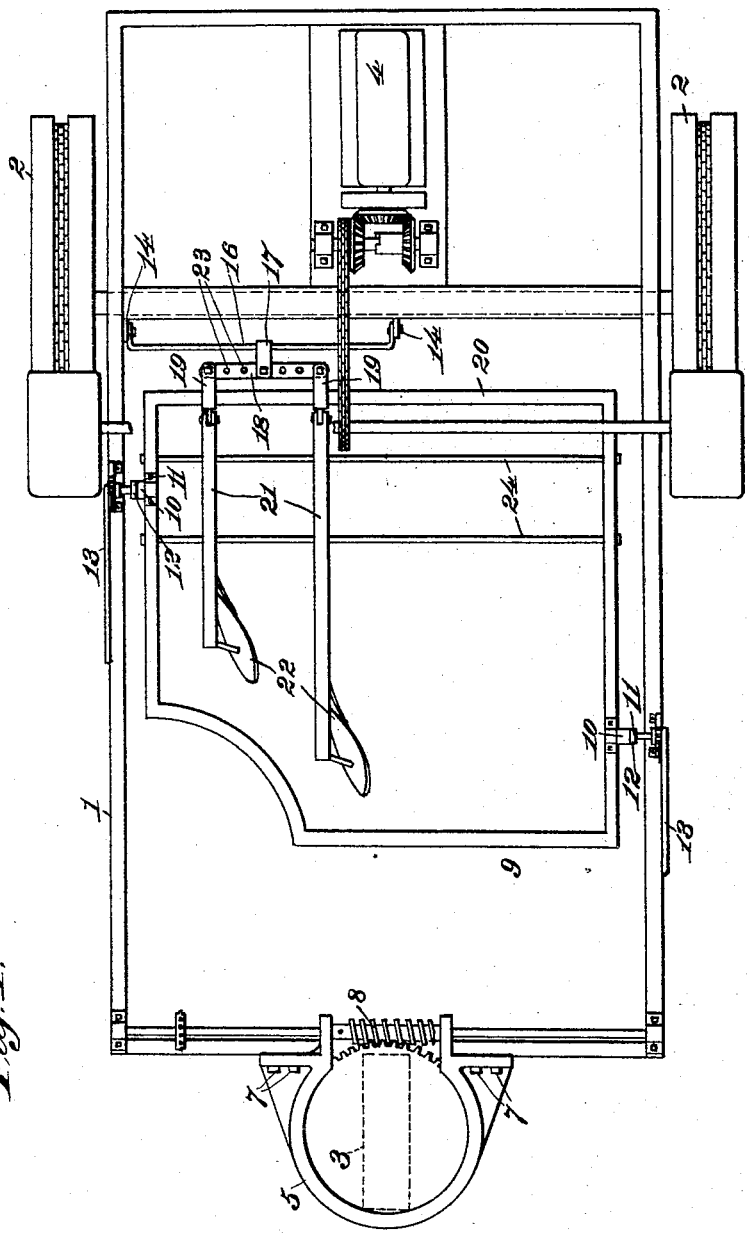

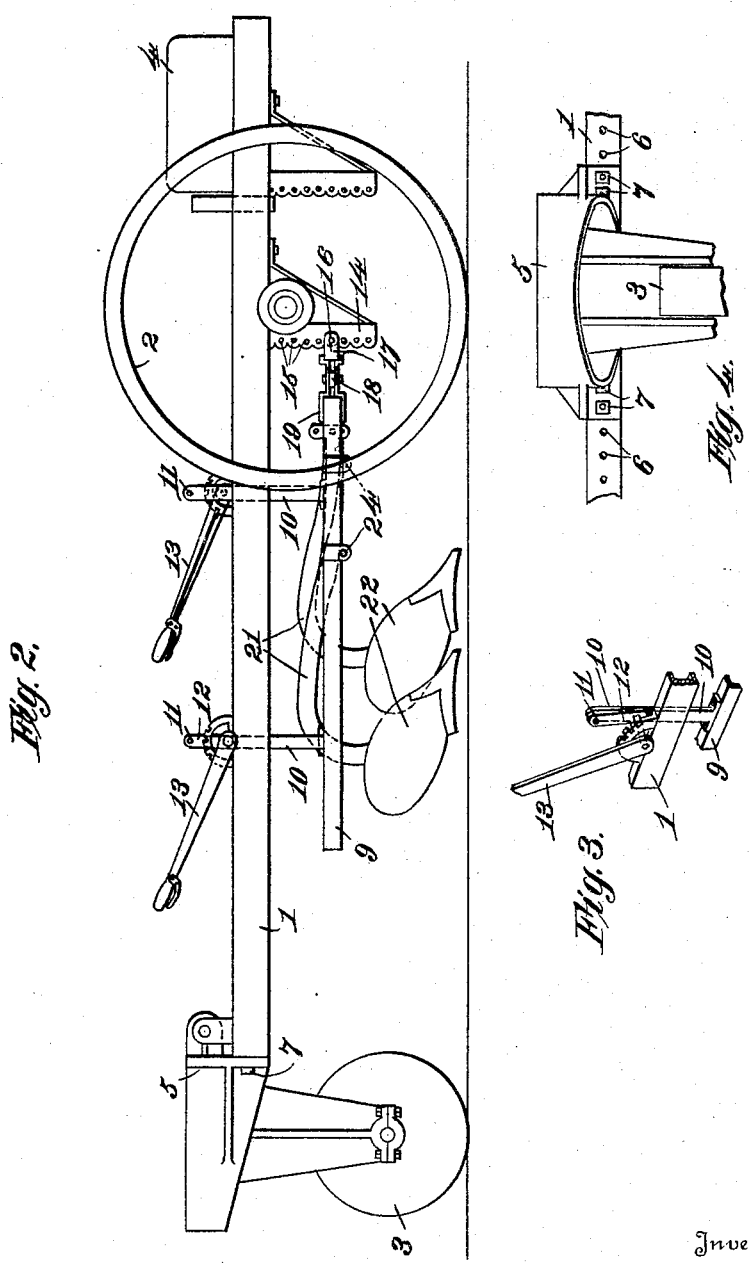

EDWARD W. COOK, OF GALION, OHIO.

MOTOR-PLOW.

1,213,336.  Specification of Letters Patent.  Patented Jan. 23, 1917.

Original application filed April 19, 1915, Serial No. 22,341. Divided and this application filed September 2, 1915. Serial No. 48,600.

*To all whom it may concern:*

Be it known that I, EDWARD W. COOK, a citizen of the United States, residing at Galion, county of Crawford, and State of Ohio, have invented certain new and useful Improvements in Motor-Plows, of which the following is a specification.

My invention relates to plows or similar agricultural implements and particularly to devices of this character mounted upon and operated by a motor driven tractor. Specifically, the present application is a division of my co-pending application Serial No. 22,341, filed April 19, 1915.

The object of my invention is to provide in a device of the character mentioned, means for securing a gang of plows or cultivators to the tractor and equipping the same with improved means whereby the plows or cultivator shovels may be laterally adjusted with relation to the tractor and also readily raised and lowered simultaneously.

A further object of my invention is to provide in a tractor equipped with laterally adjustable plows or shovels, means for adjusting the rear tractor wheel so as to avoid interference with the work of the implements.

Other objects will appear hereinafter.

With these objects in view my invention consists generally in a frame mounted upon wheels and equipped with means for driving the same in combination with an auxiliary frame adjustably mounted upon the first mentioned frame for vertical adjustment and laterally adjustable means for securing plows or similar implements upon the auxiliary frame.

My invention further consists in a device as mentioned further characterized by means for supporting the implement bearing members whereby they may be all raised simultaneously with the auxiliary frame.

My invention further consists in a device as mentioned including the laterally adjustable soil tilling implements further characterized by having a single rear tractor wheel on the main frame and mounted thereon so as to be laterally adjustable to avoid interference with the work of the implements.

My invention further consists in various details of construction and arrangement of parts all as will be fully described hereinafter and particularly pointed out in the claims.

My invention will be more readily understood by reference to the accompanying drawings forming a part of this specification and in which—

Figure 1 is a plan view of a power driven plow embodying my invention in its prefered form, the driving mechanism being shown conventionally, Fig. 2 is a side elevation of a device with the driving mechanism omitted, Fig. 3 is a perspective view of one of the devices used for raising and lowering the auxiliary frame, and Fig. 4 is a detail rear elevation illustrating the manner of adjustably securing the rear tractor wheel to the main frame.

Referring now to the drawings 1 indicates the main frame of the device, preferably rectangular in form and mounted upon a pair of front wheels 2—2 and a rear wheel 3.

4 indicates a motor of any suitable type for driving the tractor and connected to the tractor wheels in any suitable manner.

The manner of driving the tractor not forming a part of the present application, detailed description thereof will be omitted; the preferred form of driving mechanism being completely described and illustrated in the parent application.

The rear wheel 3 is mounted upon a bracket 5, said bracket being secured upon the frame 1 so as to permit of lateral adjustment thereon. To this end the rear transverse member of the frame 1 is provided with a series of apertures or bolt holes 6 to receive the bolts 7 by means of which the bracket is secured in position. Suitable steering mechanism 8 may be provided for the rear tractor wheel 3, but this forms no portion of the present application.

9 indicates an auxiliary frame to which are secured a pair of upwardly extending arms 10, the upper ends of which are connected as at 11 to crank arms 12 pivotally mounted upon the main frame 1. Operating levers 13 are secured to the cranks 12 for manually operating the same. It is obvious that by swinging the levers 13 the auxiliary frame 9 will be raised or lowered. The raising and lowering devices above described are arranged, one upon each side of the device, with one located adjacent the forward end of the auxiliary frame and the other adjacent the rear end.

Two vertically disposed brackets 14 are secured to the main frame adjacent the axle of the front wheels 2 and said brackets are provided with a series of apertures 15 to receive bolts for securing a transverse bar 16 thereto. A clevis 17 is laterally slidable upon the bar 16 and to said clevis is attached a transverse bar 18. Connected to the bar 18 is a plurality of clevises 19 which also engage the front member 20 of the auxiliary frame 9 and to each of which is secured a beam 21 upon which is mounted a plow 22 or other similar implement. The bar 18 is provided with a plurality of apertures 23 whereby the clevises 19 and the beams 21 may be laterally adjusted with relation to each other. It is also obvious that the gang of plows may be readily adjusted laterally of the frame.

24 indicates a pair of struts extending transversely of the frame 9 and upon which the beams 21 rest when the frame 9 is in elevated position, means for this purpose being necessitated by the pivotal connection of the beams 21 with the clevises 19. By this arrangement the struts 24 limit the depth of the furrow according to the position of the auxiliary frame and also permit raising of the individual plows automatically should they encounter material offering too great a resistance.

It is obvious that with a device as above described, the implements may be readily adjusted laterally of the frame and also readily raised and lowered as desired. Also the rear wheel 3 of the main frame may be laterally adjusted to avoid interfering with the work of the implements as found necessary.

I claim:

1. In a device of the class described, a main frame mounted on wheels, a plow frame secured to said main frame for adjustment vertically thereof, a plurality of plow beams pivotally connected to said frame, a pair of struts extending crosswise of said plow frame beneath said beams for supporting the plows carried thereby when the frame is raised, a clevis on said main frame, and a link for connecting said plow frame and clevis, substantially as described.

2. In a device of the class described, a main frame mounted upon wheels, an auxiliary frame, a vertically adjustable connection between one end of said auxiliary frame and said main frame, means for further supporting said auxiliary frame secured to said main frame, means for raising and lowering said support, plow beams pivotally secured to said plow frame, struts extending crosswise of said auxiliary frame to support said plow beams when said auxiliary frame is raised, as and for the purpose set forth.

3. In a device of the class described, a main frame mounted on wheels, a plow frame, supporting means on said main frame for raising and lowering said plow frame, brackets secured to said main frame, a bar mounted transversely of said main frame and adjustably secured to said brackets, connecting means between said bar and said plow frame and means for adjustably securing plows to said frame, substantially as described.

4. In a device of the class described, a main frame mounted on wheels, a plow frame supported thereon, brackets secured to said main frame, a bar mounted transversely of said main frame and adjustably secured to said brackets, a second bar adjacent said first mentioned bar and provided with perforations, means slidably mounted upon said first mentioned bar for adjustably securing said second bar, plows mounted upon said plow frame and means for connecting said plows to said second bar, as and for the purpose set forth.

In testimony whereof I have signed my name to this specification in the presence of two subscribing witnesses.

EDWARD W. COOK.

Witnesses:
JOHN H. COOK,
MILDRED RICKER.

Copies of this patent may be obtained for five cents each, by addressing the "Commissioner of Patents, Washington, D. C."